US007983945B2

(12) United States Patent
DiBernardino et al.

(10) Patent No.: US 7,983,945 B2
(45) Date of Patent: Jul. 19, 2011

(54) METHOD AND SYSTEM FOR ANALYSIS OF FINANCIAL INVESTMENT IN HUMAN CAPITAL RESOURCES

(75) Inventors: Francis J. DiBernardino, Glen Mills, PA (US); Michael K. McClure, Voorhees, NJ (US)

(73) Assignee: Vienna Human Capital Advisors, LLC, Glen Mills, PA (US)

( * ) Notice: Subject to any disclaimer, the term of this patent is extended or adjusted under 35 U.S.C. 154(b) by 945 days.

(21) Appl. No.: 11/873,034

(22) Filed: Oct. 16, 2007

(65) Prior Publication Data
US 2008/0249824 A1 Oct. 9, 2008

Related U.S. Application Data

(60) Provisional application No. 60/829,969, filed on Oct. 18, 2006.

(51) Int. Cl.
G06F 11/30 (2006.01)
G07F 19/00 (2006.01)
G06Q 10/00 (2006.01)

(52) U.S. Cl. ........ 705/7.36; 702/182; 705/30; 705/7.22; 705/7.38; 705/7.42

(58) Field of Classification Search .......... 702/182; 705/730, 7.22, 7.36, 7.38, 7.42
See application file for complete search history.

(56) References Cited

U.S. PATENT DOCUMENTS

| 6,566,974 | B2 | 5/2003 | Tsubouchi | 333/12 |
| 6,850,893 | B2 | 2/2005 | Lipkin et al. | 705/8 |
| 7,233,971 | B1 * | 6/2007 | Levy | 709/203 |
| 2002/0049603 | A1 | 4/2002 | Mehra et al. | 705/1 |
| 2002/0055870 | A1 | 5/2002 | Thomas | 705/10 |
| 2002/0143496 | A1 * | 10/2002 | Mactas et al. | 702/179 |
| 2002/0191680 | A1 | 12/2002 | Ozluturk | 375/147 |
| 2002/0198765 | A1 | 12/2002 | Magrino et al. | 705/11 |
| 2002/0198766 | A1 | 12/2002 | Magrino et al. | 705/11 |
| 2003/0083898 | A1 | 5/2003 | Wick et al. | 705/1 |
| 2003/0101091 | A1 | 5/2003 | Levin et al. | 705/11 |
| 2003/0195786 | A1 | 10/2003 | Dewar | 705/8 |
| 2003/0200136 | A1 | 10/2003 | Dewar | 705/11 |
| 2003/0229529 | A1 | 12/2003 | Mui et al. | 705/8 |
| 2004/0010459 | A1 | 1/2004 | Zatlukal | 705/36 |
| 2004/0030566 | A1 | 2/2004 | Rix | 705/1 |
| 2005/0065841 | A1 | 3/2005 | Middleton | 705/11 |

(Continued)

OTHER PUBLICATIONS

The Surprising Economics of a People Business, Barber and Strack, Harvard Business Review, Jun. 2005.*

(Continued)

*Primary Examiner* — Shahid R Merchant
*Assistant Examiner* — William Rankins
(74) *Attorney, Agent, or Firm* — Saul Ewing LLP

(57) ABSTRACT

A method and system for analyzing an organization's investment in human capital resources is provided to assist in improving the organization's overall financial performance. The method includes receiving inputted data retrieved from common accounting records regularly maintained in connection with operation of the organization. Further, the present invention provides a novel approach particularly relevant for precise analysis of people-intensive organizations, such as service-providing organizations. The approach involves calculation of values for newly defined HCP, ROHS and PS metrics. Aggregation of the metric values into a single index value metric facilitates benchmarking of an organization against itself and others. A report is provided that identifies factors most responsible for influencing the overall index, which assists the organization's management in determining how to implement change in the organization that will improve the metrics and thus the overall profitability of the organization.

24 Claims, 10 Drawing Sheets

U.S. PATENT DOCUMENTS

| | | | |
|---|---|---|---|
| 2005/0222899 A1 | 10/2005 | Varadarajan et al. | 705/11 |
| 2006/0015393 A1 | 1/2006 | Eisma et al. | 705/11 |
| 2006/0031115 A1 | 2/2006 | Eisma et al. | 705/11 |
| 2006/0229896 A1 | 10/2006 | Rosen et al. | |
| 2007/0250417 A1* | 10/2007 | Lane et al. | 705/30 |

OTHER PUBLICATIONS

Human Capital Analytics The Missing Link: Measuring Financial Returns on the Human Capital Investment by Frank DiBernardino and Adrianne Miller—2008.*

Intellectual Capital ROI: A causal map of human capital antecedents and consequents Dr. Nick Bontis, Dr. Jac Fitz-enz, 2002, Journal of Intellectual Capital.*

Developing knowledge management metrics for measuring intellectual capital, Liebowitz, Jay and Suen, Ching, 2000, Journal of Intellectual Capital.*

Human Capital Analytics—Vienna Human capital Advisors—Executive Briefing, Bernardino, Frank and Miller, Adrianne, 2008.*

Press Releases—Vienna Human capital Advisors—2008.*

Human Capital and Organizational performance: Next Generation metrics as a Catalyst for Change, Bassi and McMurrer, Apr. 2006.*

ROI on Human Capital Investment, Michael Echols, 2005.*

Proving the value of HR, Philiips, 2005.*

HR Metrics the world calss way, Sullivan 2004.*

Barber, F. and Strack, R.: The surprising Economics of a "People Business". In: Harvard Business Review, Jun. 2005, p. 81-90.

Fitz-Enz, Jac.: The ROI of Human Capital: Measuring the Economic Value of Employee Performance. ISBN No. 0-8144-0574-6, Year 2000, p. 30-46 and Figure 11-1, printed in the U.S.A.

International Search Report, dated Jul. 11, 2008, issued in corresponding International Application No. PCT/US07/22222.

* cited by examiner

FIGURE 3A

Vienna Human Capital Performance Index Data Request

| Company: | XYZ Global Industries | Prepared by: | Frank DeBernardino |
|---|---|---|---|
| Evaluation Time period: | 2006 | Approved by: | |
| Date completed: | April 11, 2007 | | 100 |

The Income Statement Data

| | | Company | LOB | | | Geographic Regions | | | | Business Units | | | | Individual Offices | | |
|---|---|---|---|---|---|---|---|---|---|---|---|---|---|---|---|---|
| Account Numbers | Category | XYZ Global Industries | Line of Business | Southeast | Mid-Atlantic | Northeast | Central | Midwest | West | Chicago | Denver | Ohio | Tampa | Pittsburgh | Dallas |
| | Revenue | | | | | | | | | | | | | | |
| | Standard Commission & Fees | $146,076,232 | | $16,522,320 | $14,009,400 | $33,618,806 | $12,520,660 | $32,660,930 | $7,373,542 | $4,838,933 | $1,486,393 | $9,324,295 | $2,695,627 | $2,184,398 | $2,614,605 |
| | Non-Standard Commission and Fees | $7,975,399 | | $1,202,378 | $681,578 | $2,375,806 | $23,137 | $3,328,266 | $241,752 | $334,340 | $30,554 | $2,327 | $232,646 | $77,073 | $0 |
| | TOTAL COMMISSIONS AND FEES | $156,051,951 | | $17,774,706 | $14,610,978 | $35,994,412 | $12,543,798 | $35,989,196 | $7,615,295 | $5,173,273 | $1,516,946 | $8,326,652 | $2,928,272 | $2,261,472 | $2,614,605 |
| | Human Capital Costs | | | | | | | | | | | | | | |
| | *Employee Costs (Pay, Benefits & Taxes)* | | | | | | | | | | | | | | |
| | *Salaries & Commissions* | | | | | | | | | | | | | | |
| Brokerscomm | Brokers Commissions | $1,107,635 | | $23,442 | $163,345 | $645,041 | $164,979 | $30,223 | $6,155 | $270 | $0 | $0 | $0 | $163,345 | $63,101 |
| 500 | Executive Salaries | $5,521,327 | | $609,833 | $135,494 | $1,107,349 | $372,834 | $882,533 | $202,745 | $122,538 | $37,500 | $166,985 | $337,684 | $72,179 | $49,511 |
| 501 | Office Salaries | $20,232,285 | | $2,850,546 | $2,399,084 | $6,492,023 | $2,012,878 | $5,928,901 | $1,255,577 | $965,679 | $387,414 | $1,747,436 | $530,784 | $431,396 | $512,346 |
| 502 | Sales Salaries (Variable Compensation) | $17,318,026 | | $2,099,946 | $1,933,275 | $4,890,436 | $2,900,334 | $2,555,682 | $1,050,403 | $875,329 | $130,417 | $530,497 | $291,866 | $425,230 | $511,990 |
| 503 | Sales Commissions (Variable Compensation) | $9,746,467 | | $1,501,206 | $1,397,568 | $133,355 | $269,847 | $4,000,153 | $678,778 | $310,882 | $247,207 | $1,074,782 | $261 | $56,792 | $109,306 |
| | Bonuses | | | | | | | | | | | | | | |
| 504 | Executive Bonuses | $370,452 | | $17,501 | $0 | $0 | $350 | $252,601 | $0 | $0 | $0 | $0 | $18,200 | $0 | $0 |
| 505 | Office Bonuses | $1,592,629 | | $111,226 | $191,783 | $114,877 | $81,606 | $797,687 | $53,551 | $40,436 | $6,970 | $34,260 | $12,018 | $1,999 | $4,456 |
| 506 | Sales Bonuses | $4,908,621 | | $309,312 | $536,298 | $661,517 | $220,877 | $782,473 | $7,491 | $117,748 | $0 | $0 | $57,393 | $5,528 | $21,606 |
| | *Other Compensation and Benefits* | | | | | | | | | | | | | | |
| 507 | Deferred Compensation | $94,002 | | $0 | $0 | $46,882 | $0 | $355 | $238 | $0 | $0 | $0 | $0 | $0 | $0 |
| 510 | Payroll Taxes | $4,265,574 | | $433,928 | $376,279 | $1,014,700 | $335,367 | $909,824 | $216,091 | $155,973 | $47,670 | $225,997 | $75,515 | $84,440 | $78,814 |
| 511 | Employee Insurance | $3,789,447 | | $543,828 | $377,711 | $498,437 | $458,894 | $882,904 | $223,837 | $151,755 | $36,538 | $239,320 | $61,371 | $73,474 | $95,735 |
| 512 | Profit Sharing Plan | $1,370,953 | | $170,792 | $134,357 | $297,177 | $109,941 | $286,977 | $62,473 | $30,697 | $18,396 | $79,039 | $21,003 | $26,149 | $23,058 |
| 513 | Other Employee Benefits | ($17,567) | | $19,057 | $2,254 | ($67,139) | $7,126 | $10,139 | $3,451 | $5,528 | $90 | $2,264 | $0 | $0 | $0 |
| | Total Employee Costs | $78,299,871 | | $8,610,623 | $7,627,448 | $15,834,666 | $6,835,031 | $17,325,451 | $3,770,790 | $2,776,833 | $912,201 | $4,100,588 | $1,406,055 | $1,340,533 | $1,469,922 | to Figure 3B

FIGURE 3B

From Figure 3B

FIGURE 3C

| Figure 3A | |
| Figure 3B | |
| Figure 3C | FIGURE 3 |

US 7,983,945 B2

METHOD AND SYSTEM FOR ANALYSIS OF FINANCIAL INVESTMENT IN HUMAN CAPITAL RESOURCES

CROSS-REFERENCE TO RELATED APPLICATION

This application claims the benefit under 35 U.S.C. §119 (e) of U.S. Application No. 60/829,969, filed Oct. 18, 2006, the entire disclosure of which is hereby incorporated herein by reference.

FIELD OF THE INVENTION

The present invention relates generally to a method and system for analyzing an organization's investment in human capital resources to assist in improving the organization's overall financial performance.

DISCUSSION OF THE RELATED ART

Performance of for-profit organizations has long been monitored, measured, and reported, in a variety of ways. Conventional techniques typically place a greater emphasis on analysis relating to equipment, real estate, inventory and other tangible assets, which is often appropriate for manufacturing or other organizations having predominantly tangible assets, having expenses that are predominantly related to such tangible assets, and having revenues and profits that are predominantly influenced by the operation, use, etc. of such tangible assets.

Today, many for-profit (and tax-exempt) organizations are service-based organizations. Many of such service organizations have significantly fewer, less costly tangible assets than traditional manufacturing or other organizations. Further, the revenues such service organizations are influenced to a significantly lesser degree by the operation, use, etc. of its tangible assets. Instead, the "assets" of such service organizations are of a human nature, in the form of the knowledge, expertise, skills and efforts of its employees, etc. The service organization's revenues are predominantly influenced by the individual and collective efforts of such individuals. Salaries, benefits and other expenses for such individuals are often one of the service organization's most significant expenses. Organizations having one or more of such characteristics are referred to herein as "people-intensive" organizations. Examples of such people-intensive organizations include a broad range of consulting firms, law firms, accounting firms, medical practices and other professional service firms.

Accordingly, it is increasingly important to identify and analyze with precision the productivity and costs associated with such individuals in order to properly and effectively manage and improve the profitability of such people-intensive organizations. We have found that prior techniques are insufficient, and suffer from improper analogies to manufacturing or other conventional organizations and/or have failed to properly adapt to changes in which such organizations conduct business.

SUMMARY OF THE INVENTION

Broadly speaking, the present invention provides a method and system for analyzing an organization's investment in human capital resources to assist in improving the organization's overall financial performance. More specifically, an exemplary embodiment of the method includes inputting data retrieved from common accounting records regularly maintained in connection with operation of the organization. Further, the present invention provides methods, expressed in equation form, for calculating specific, newly-defined metrics described herein that have been determined to be particularly relevant for precise analysis of people-intensive organizations, namely: Human Capital Productivity (HCP), Human Capital Return on Investment (ROHC), and Profit Sensitivity (PS) metrics. The present invention further provides for calculation of an index value as a function of these metrics, for benchmarking an organization against itself and others in the same industry by period-to-period comparison of data, and for providing a report identifying factors that are most responsible for influencing the metrics, which assists the organization's management in determining how to implement change in the organization that will improve the metrics and thus the overall profitability of the organization.

In a general sense, the metrics are structured to place an emphasis on the productivity of all human capital resources, i.e. people, rather than financial capital, and thus isolate the main driver of financial performance in people-intensive organizations. Further, the metrics are structured to focus on a broad range of human capital costs, not just costs of salaried employees, or other narrowly defined costs of human capital. This provides useful information to identify parameters that may be altered to improve financial performance, at both the corporate and business unit level, and to allow for benchmarking, over time, in comparison to competitors, etc.

BRIEF DESCRIPTION OF THE DRAWINGS

The present invention will now be described by way of example with reference to the following drawings in which:

FIG. 3 is an image of a graphical user interface of the system of FIG. 1 for receiving input for use in the method of FIG. 2;

DETAILED DESCRIPTION

An embodiment of the present invention provides a method and system for analyzing an organization's investment in its human "assets", i.e., human capital resources, to assist in improving the organization's overall financial performance. More specifically, an exemplary embodiment of the method includes inputting data retrieved from common accounting records regularly maintained in connection with operation of an organization. Further, the present invention provides methods, expressed in equation form, for calculating values for newly defined Human Capital Productivity (HCP), Human Capital Return on Investment (ROHC), and Profit Sensitivity (PS) metrics. The present invention further provides an equation for calculating an index value as a function of these metrics, and for providing a report identifying factors that are most responsible for influencing the metrics, which assists the organization's management in determining how to implement change in the organization that will improve the metrics, etc. The index value is a weighted composite of the individual metrics. The index is useful for benchmarking an organization against itself and others in the same industry.

Figure 1:
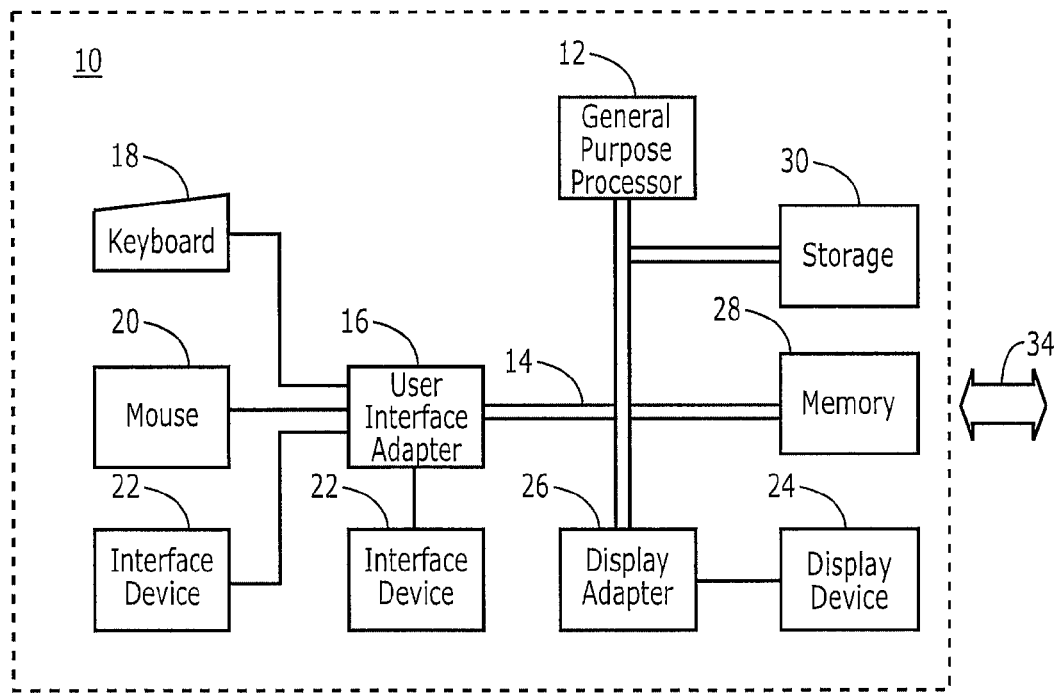
FIG. 1 is a block diagram of an exemplary computerized information processing system in accordance with the present invention.

FIG. 1 is a block diagram of an exemplary computerized information processing system 10 specially configured with software for carrying out the method(s) of the present invention. The system of FIG. 1 may be configured as a standalone workstation, a client device, a network server or other networked computer, as well known in the art. The system 10 includes a general purpose microprocessor 12 and a bus 14 employed to connect and enable communication between the microprocessor 12 and the components of the system 10 in accordance with known techniques. The system 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 (collectively, "memory") which can include a hard drive, diskette drive, tape drive, etc.

The system 10 may communicate with other computers or networks of computers, for example via a communications channel, network card or modem 34. The system 10 may be associated with such other computers in a LAN or a wide area network (WAN), or the system 10 can be a server in a client/server arrangement with another computer, etc. All of these configurations, as well as the appropriate communications hardware and software, are known in the art.

Software programming code for carrying out the present invention is typically stored in memory of some type, such as the memory 28 and/or storage 30. The functionality of such software is discussed in greater detail below.

Figure 2:
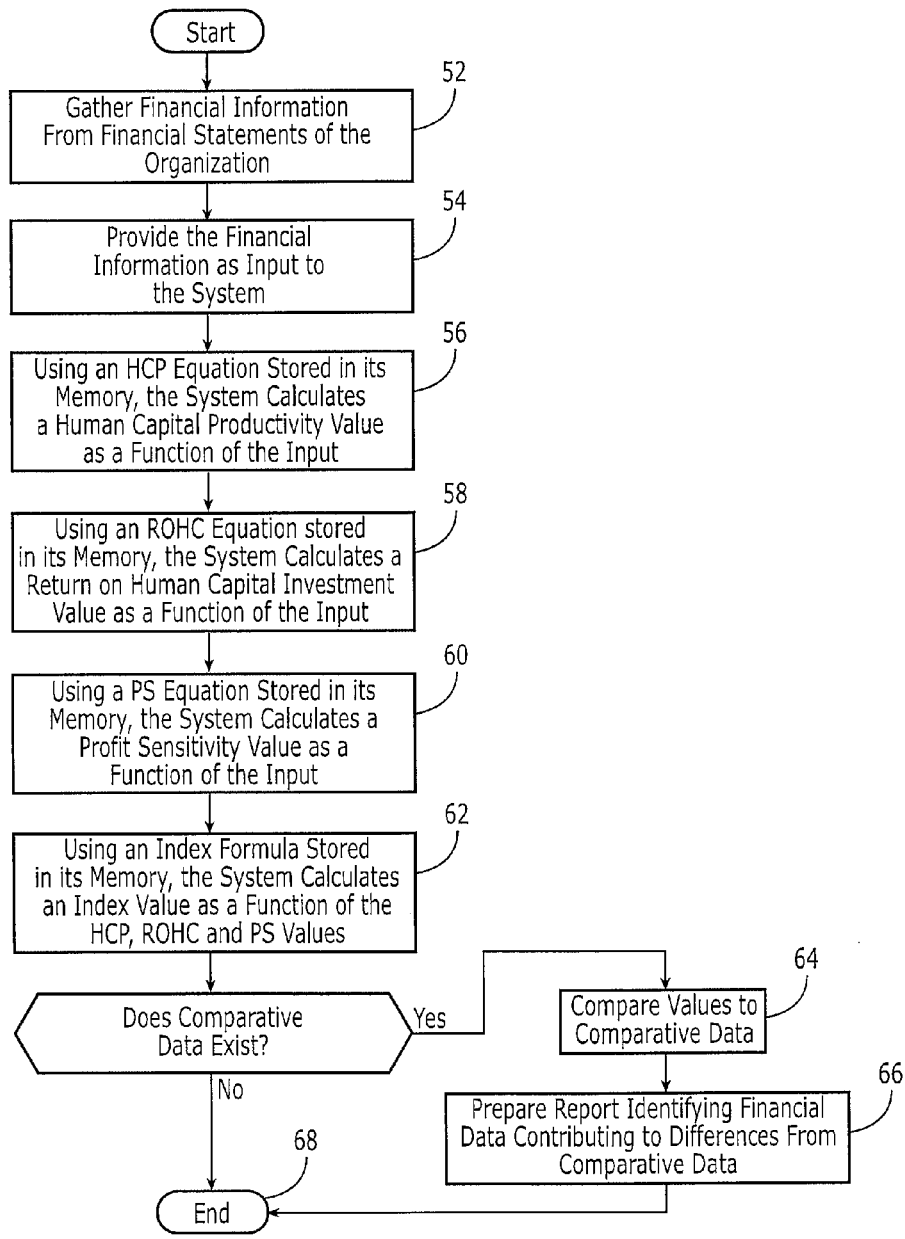
FIG. 2 is a flow diagram of an exemplary method for analyzing an organization's investment in human capital resources in accordance with the present invention.

Referring now to FIG. 2, a flow diagram 50 is shown that illustrates an exemplary method for analyzing an organization's investment in human capital resources to assist in improving the organization's overall financial performance. As shown in FIG. 2, the method begins with gathering of financial information from financial statements of the organization, as shown at step 52. Such financial statements include a Profit and Loss (P&L) statement, a balance sheet, and the general ledger (GL). These records are already being maintained routinely across most organizations. Accordingly, it is not necessary for most organizations to alter their accounting methods, or to perform substantial additional analyses, before being prepared to take advantage of the present technology. Further, the use of such records is advantageous in that they are often approved by a Chief Financial Officer (CFO) or otherwise deemed to be documents that include reliable, accurate financial information. By way of example, this step may be performed by manually reviewing existing financial statements to identify selected items of financial information. The particular items of financial information that need to be identified are those that are included as arguments of the equations for Human Capital Productivity (HCP), Return on Human Capital Investment (ROHC), and Profit Sensitivity (PS), or any items of financial information required to calculate one of those arguments, as discussed below in greater detail.

Figure 3B:
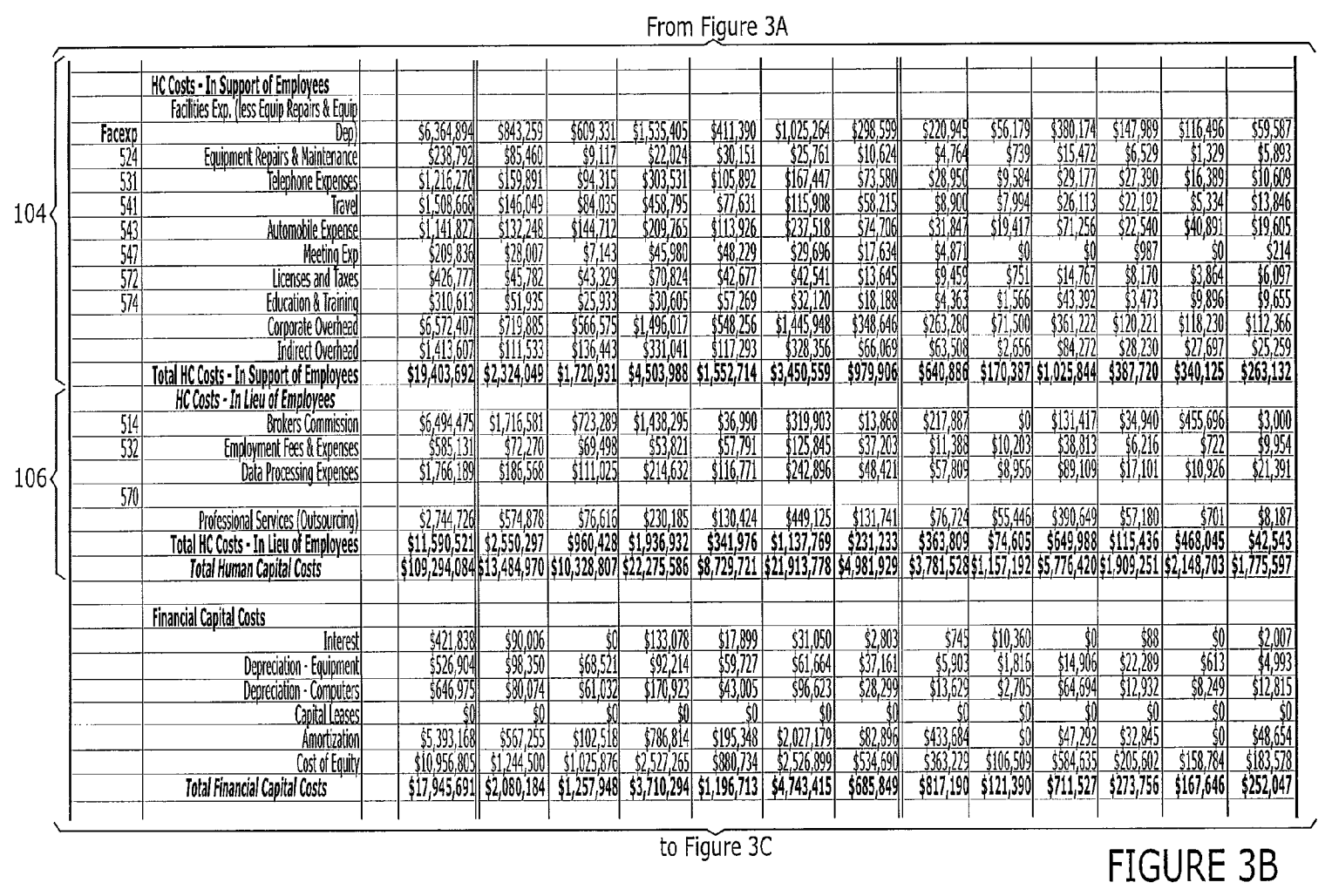

FIG. 3 is an image of a graphical user interface window 100 caused to be displayed by the specially configured system 10 of FIG. 1 for receiving input for use in the method of FIG. 2. Optionally, the graphical user interface window 100 is provided as a spreadsheet, such as a Microsoft Excel spreadsheet, that is specially configured in accordance with the present invention to request data input relevant to the index calculations, and to include formulas for performing the various index calculations discussed herein. As shown in FIG. 3, items of financial information that may be gathered from conventional financial statements include, among others: revenue, budgeted profit-driven incentive compensation, interest expense, depreciation expense, capital lease expense, amortization expense, and human capital costs. As defined herein, human capital costs (HCC) include three conceptual components, namely, employee costs, costs in support of employees, and costs in lieu of employees. By way of example, employee costs 102 include compensation costs, such as wages, salaries and variable compensation, employee benefit costs, payroll/other tax costs. Costs in support of employees 104 include costs that are incurred primarily to support employees, such as costs that would not be incurred except for the presence of the employees, such as telephone, travel and automobile costs, and licensing, education and training costs. Costs in lieu of employees 106 include costs that are paid to service providers for services that otherwise would be provided by an employee, which may be referred to as substitution costs. By way of example, costs in lieu of employees may include outsourcing costs, consultant's fees, etc. The costs in lieu of employees 106 are human capital costs external to the organization, and are captured as professional services in FIG. 3. It should be noted that the cost of equity information is essentially the company's desired/expected return on its equity, and is not typically stated on conventional financial statements. It is however, based on the equity as stated on a typical balance sheet, and is a concept and figure that is well known to CFO's and other management personnel, and thus is readily available for use in accordance with the present invention. Further, it will be appreciated that certain items of information may be combined into a single argument for inclusion in an equation for calculating a metrics or the index defined below.

The items of financial information gathered in step 52 are then provided as input to the system 10, as shown in step 54. For example, this may involve operating a keyboard to provide typed input in appropriate data entry fields 108, such as those shown in FIG. 3. By way of example, a specially-configured spreadsheet may be provided via commercially available spreadsheet software to provide the graphical user interface window of FIG. 3.

In accordance with the present invention, the system 10 stores equations for calculating values for the metrics (and index) defined herein. These equations are stored in the memory of the system 10, e.g. as part of the spreadsheet or other specially configured software.

In accordance with the present invention, the HCP, ROHC and PS metrics are calculated as determined below, and as referenced in steps 56, 58 and 60 of FIG. 2.

The first of these metrics is the Human Capital Productivity (HCP) metric. This metric is calculated by the system 10 using an HCP equation stored in its memory, and the input from step 54 that is selectively provided as input/arguments to the equation, as shown at step 56. The HCP equation is as follows:

$$HCP = \frac{R - MC}{HCC + FCC}$$

where,
R=Revenue,
MC=Material Costs,
FCC=Financial Capital Costs, and
HCC=Human Capital Costs.

Figure 4:
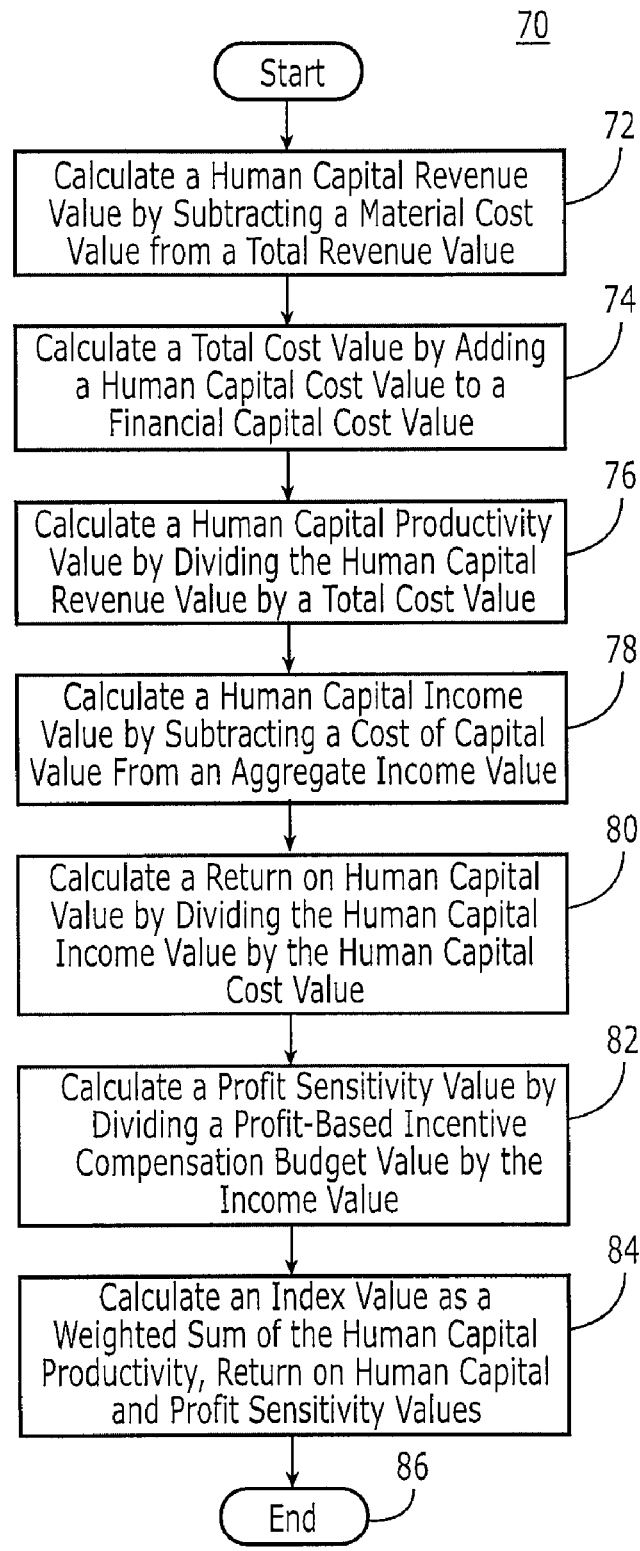
FIG. 4 is a flow diagram of an alternative exemplary method for analyzing an organization's investment in human capital resources.

Accordingly, as shown in the flow diagram 70 of FIG. 4, a method of analyzing an organization's human capital investment involves subtracting a Material Cost value, e.g. as determined from the input of step 54, from a total Revenue value, e.g. as determined from the input of step 54, to calculate a human capital related revenue value, as shown at step 72. The total Revenue, Material Cost, Financial Capital Cost and Human Capital Cost values may be compiled by extracting and/or adding values provided as input in step 54, as will be appreciated from FIG. 3. For example, for a company having total revenues of $156,051,591 and material costs of $0, the human capital revenue value is $156,051,591. It will be noted that for companies having substantial material costs, the human capital revenue value will be less than the total revenue value. This step provides for calculation of a human capital-related revenues value, which captures the portion of revenues that are most closely related to productivity of humans/human capital resources.

Next, a total cost value is calculated by adding a Human Capital Cost value to a Financial Capital Cost value, as shown at step 74. It should be noted that Financial Capital Costs as used herein is defined broadly but in a manner consistent with conventional techniques to include costs such as interest, depreciation, amortization, capital leases, and desired return on equity.

Human capital costs are often regarded as including only compensation and benefits for employees, i.e. only internal costs. It should be further noted that Human Capital Costs as used herein is defined broadly to recognize that current practices involve outsourcing of many tasks previously performed in-house by traditional organization employees. Accordingly, outsourcing costs are included in this (and our other) metrics, and the index, to provide precise analytical results. For example, Human Capital Costs as used herein includes components that are traditionally included, namely, internal costs. HCC as used herein further includes components that are not traditionally included when considering human capital costs, namely external costs, such as costs of outsourcing of services, independent contractor's fees, consultant's fees, etc. Accordingly, as used herein, HCC includes costs such as: salaries, incentive compensation, benefit costs, training costs, outsourcing service costs, independent contractor's fees, consultant's fees, etc.

Figure 5:
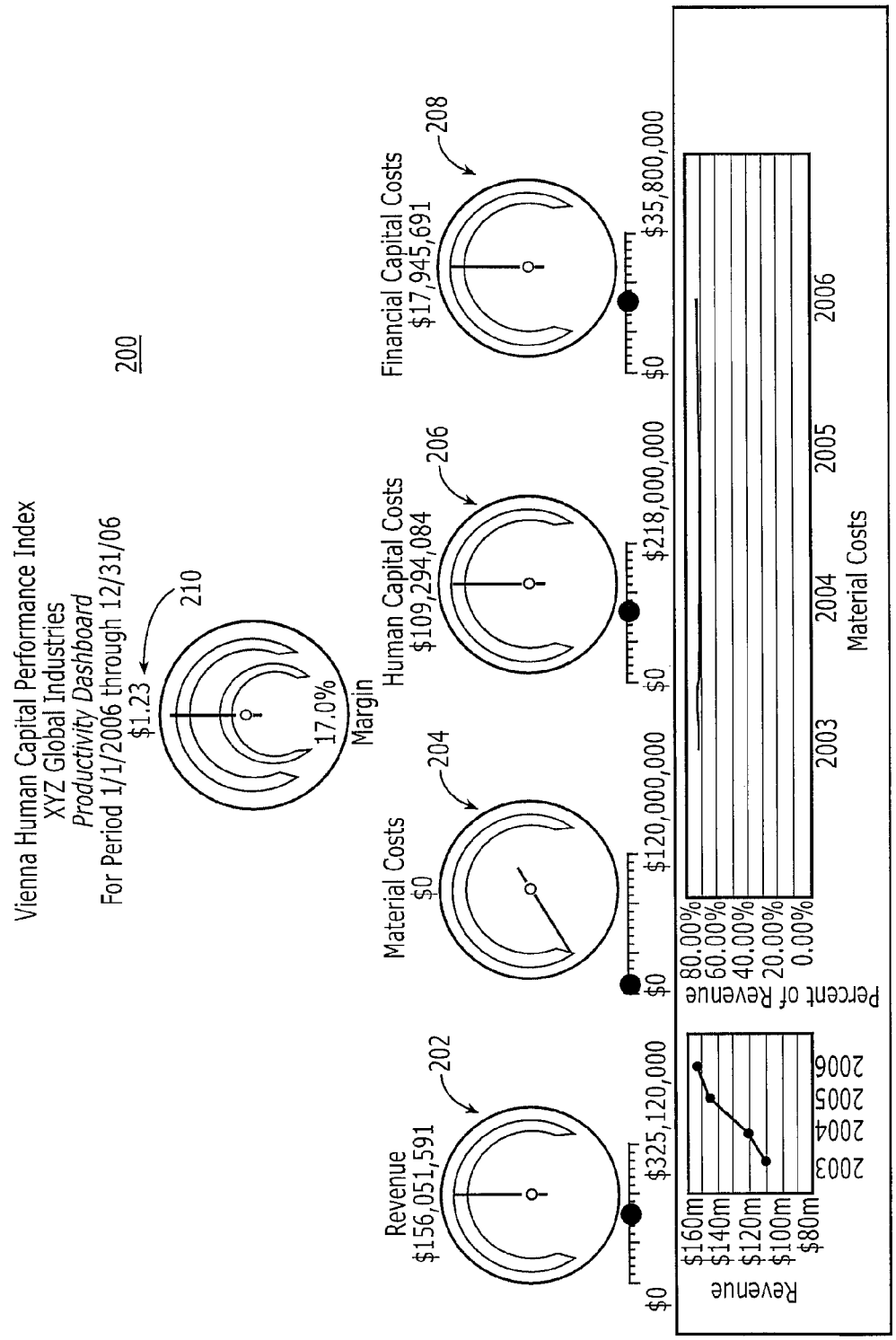
FIG. 5 is an image of a graphical user interface window displaying dial-like graphical representations of HCP data.

For example, for a company having Human Capital Costs of $109,294,084 and Financial Capital Costs of $17,945,691 as shown in the example of FIG. 5, the total cost value is $127,239,775.

A Human Capital Productivity value is then calculated by dividing the human capital revenue value by the total cost value, as shown at step 76. Accordingly, in the example above, the HCP value can be calculated to be 1.23 ($156,051,591-$0)/$127,239,775). A graphical user interface window 200 displaying dial-like graphical representations of the arguments 202, 204, 206, 208 of the HCP equation and the resultant HCP value 210 are shown in FIG. 5.

Qualitatively, the HCP metric relates all human capital related revenues to total (human capital+financial capital) costs, and thus is somewhat similar to an asset efficiency financial metric. However, whereas the asset efficiency financial metric relates total revenue to total assets, the HCP metric adjusts revenues to normalize for material costs, and uses a different cost-based denominator, and thus provides an entirely different metric.

It should be noted that this analysis of human capital productivity includes not only costs directly related to employees and costs in support of employees, which are largely internal to an organization, but also includes costs in lieu of employees, which may be largely external to an organization. An example of costs in lieu of employees is outsourcing costs, which are becoming a more significant component of an organization's investment in human capital. Accordingly, the inventive analysis is not limited to costs of "employees" in the traditional sense, but rather focuses much more broadly on human capital costs, including those relating to costs in lieu of employees, which may relate to human capital resources external to the organization. This provides a more precise measure of an organization's productivity associated with human capital expenses. This capturing of broad ranging Human Capital Costs is facilitated by calculating the denominator of HCP to include not only employee costs, but also costs in support of employees, and costs in lieu of employees, and thus includes costs related to human capital resources that are both internal and external to an organization. This approach is significantly more comprehensive than focusing on any combination of per-employee costs.

Optionally, these costs are segmented. For example, such costs may be segmented by Cost of Goods Sold (COGS) and Sales & General Administration (SG&A) for a manufacturing firm. While such segmentation of costs is conventional for the purpose of distinguishing gross margin from net margin for manufacturing firms, this conventional segmentation is used to advantage in a novel manner consistent with the present invention to facilitate the present analysis. A segmentation of human capital costs by COGS and SG&A, and allows an organization to measure how these costs are changing in relation to one another over time, and in relation to peer organizations and business units within the company. Segmentation in this manner will facilitate analysis of cost trends and add valuable data upon which investment decisions can be made. For instance, such data can assist in making a decision as to whether it is better to in-source or outsource a particular business function.

In other embodiments, such costs may not be segmented, as is typical of a firm providing professional services. One such example is provided in FIG. 3.

The next metric is the Return on Human Capital Investment (ROHC). This metric is calculated by the system 10 using an HCP equation stored in its memory, and the input from step 54 that is selectively provided as input/arguments to the equation, as shown at step 58. The ROHC equation is defined as follows:

$$ROHC = \frac{I - FCC}{HCC}$$

where,
I=Income (preferably defined as EBITDA),
FCC=Financial Capital Costs (defined above), and
HCC=Human Capital Costs.

Referring again to the flow diagram 70 of FIG. 4, the method involves subtracting a Financial Capital Costs value from an aggregate Income value to calculate a human capital-related income value, as shown at step 78. The Financial Capital Costs value may be extracted and/or compiled by adding values provided as input in step 54, as will be appreciated from FIG. 3.

A Return On Human Capital value is then calculated by dividing the human capital income value by the Human Capital Cost value, as shown at step 80. Thus, ROHC relates a "truer" income/profit value to human capital costs. Thus, ROHC is somewhat similar to a "return on assets" financial metric, but instead is a value-based calculation; the return on assets metric does not measure the return after invested capital. This ROHC metric is particularly important for people-intensive organizations in which employees represent both a major cost component and a major value creation component. Thus, even small changes in operational performance that impact human capital costs can result in a significant change in return on human capital. It should be noted that the considerations above regarding human capital costs, both internal and external, relate as well to the ROHC metric.

Figure 6:
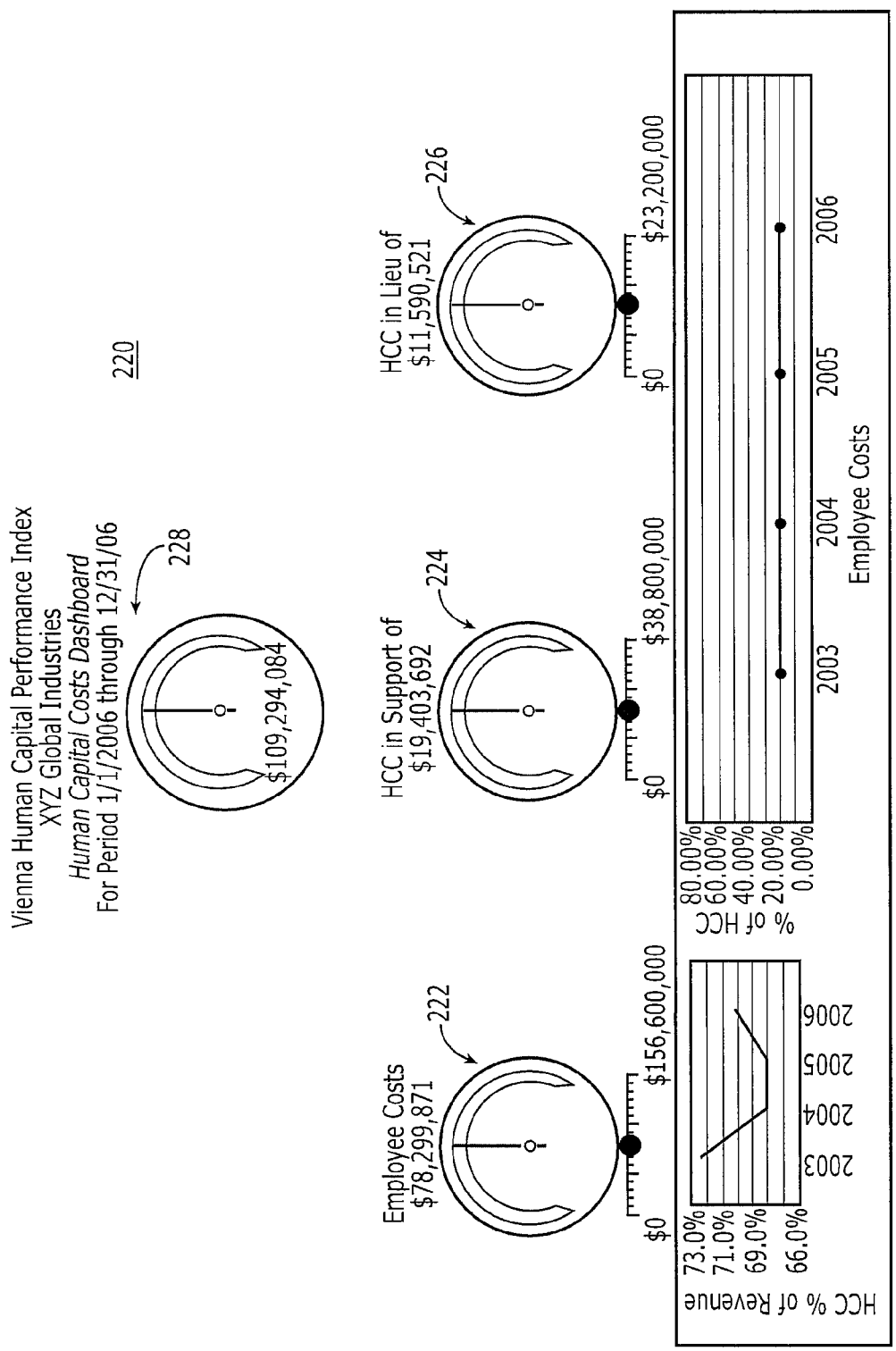
FIG. 6 is an image of a graphical user interface window displaying dial-like graphical representations of Human Capital Costs segmented by Employee Costs, Human Capital Costs in Support of Employees, and Human Capital Costs in Lieu of Employees.

In the example of FIG. 3, an exemplary company having employee costs 222 of $78,299,871, costs in support of employees 224 of $19,403,692, and costs in lieu of employees of $11,590,521, has a total Human Capital Costs of $109,294,084 (HCC=employee costs+costs in support of employees+costs in lieu of employees). A graphical user interface window 220 displaying dial-like graphical representations of the arguments 222, 224, 226 of the Human Capital Costs equation and the resultant HCC value 228 are shown in FIG. 6.

Figure 7:
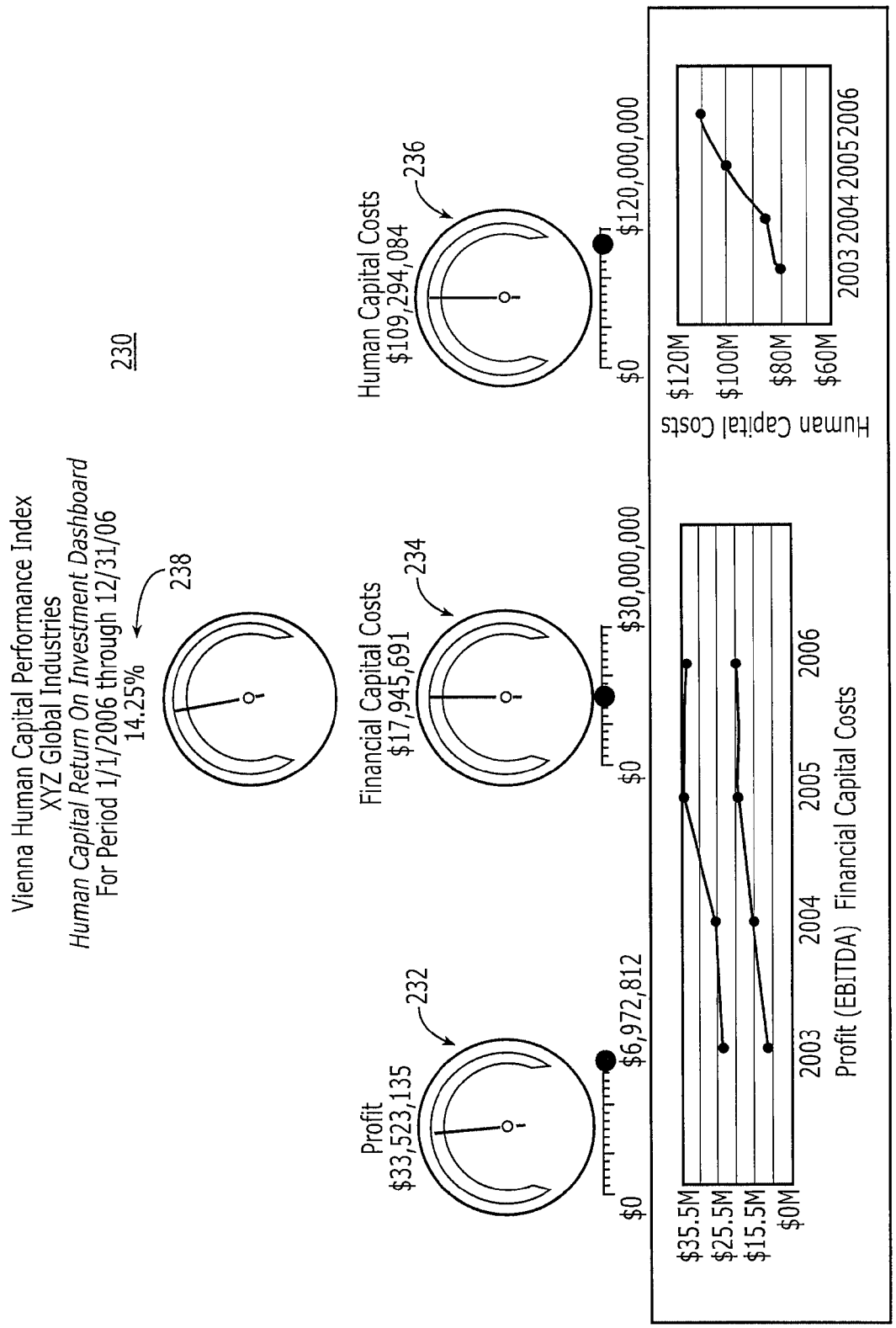
FIG. 7 is an image of a graphical user interface window displaying dial-like graphical representations of ROHC data.

In the example of FIG. 3, for the exemplary company having a total Income (EBITDA/Profit) value of $33,523,135, a Financial Capital Costs value of $17,945,691, and a Human Capital Costs value of $109,294,084, the ROHC is calculated to be 0.1425 or 14.25%. A graphical user interface window 230 displaying dial-like graphical representations of the arguments 232, 234, 236 of the ROHC equation and the resultant ROHC value 238 are shown in FIG. 7.

The third metric is the Profit Sensitivity (PS) metric. The PS metric is calculated by the system 10 using a PS equation stored in its memory, and the input from step 54 that is selectively provided as input/arguments to the equation, as shown at step 60. The PS equation is defined as follows:

$$PS = \frac{IC}{I_C}$$

where,

IC=profit-driven (profit-linked) Incentive Compensation, as budgeted, and $I_C$=Income (as defined according to client preferences, such as Net Profit before Taxes, Net Profit after Taxes, or EBITDA).

Referring again to the flow diagram 70 of FIG. 4, the method involves dividing a profit-driven incentive compensation budget value by an Income value, as shown at step 82. The IC and $I_C$ values may be extracted and/or compiled by adding values provided as input in step 54, as will be appreciated from FIG. 3. For example, the $I_C$ value may be a profit-driven incentive compensation target value, as defined by the client, e.g. in relation to a profit goal.

Figure 8:
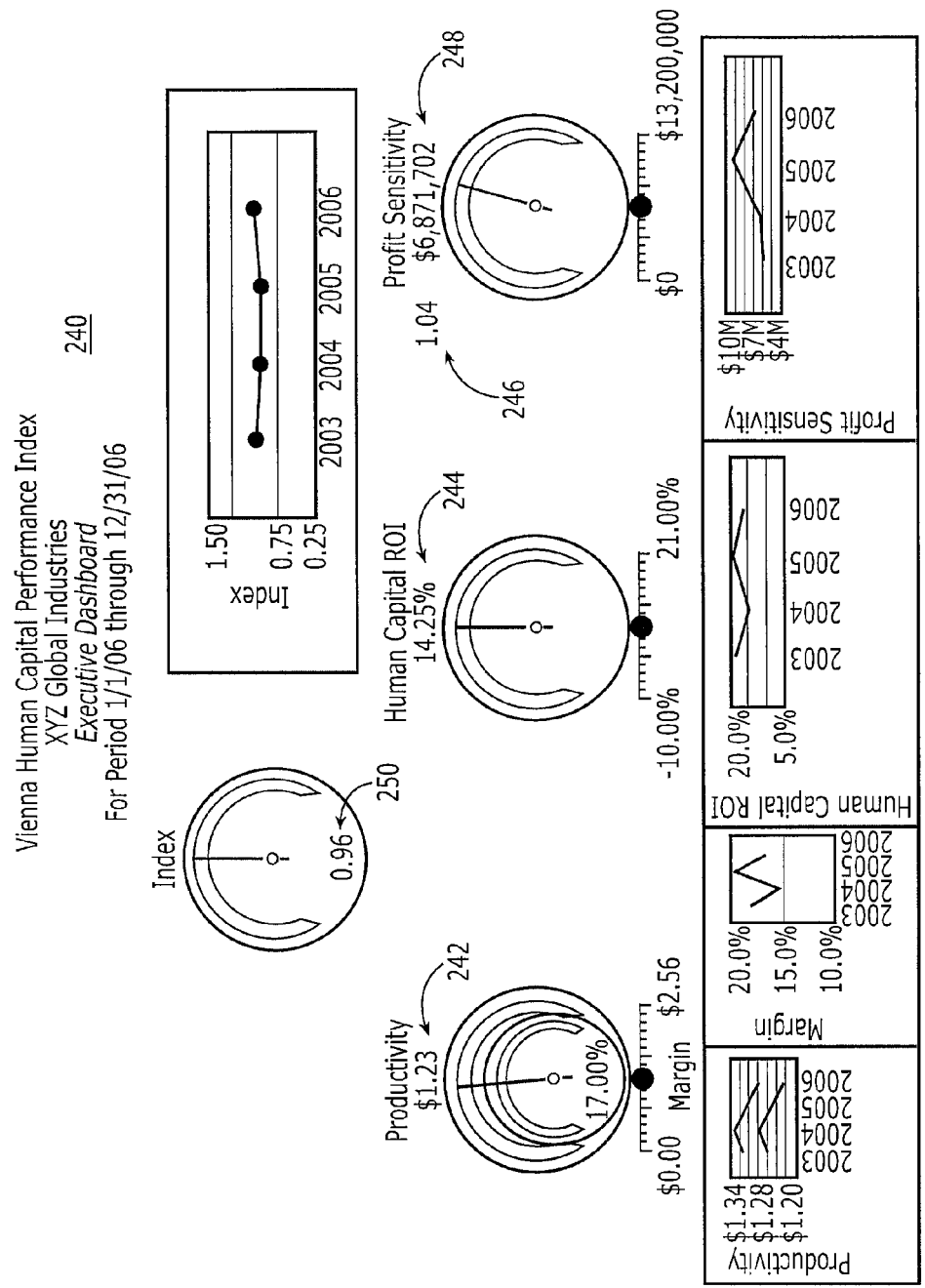
FIG. 8 is an image of a graphical user interface window displaying dial-like graphical representations of Index equation data.

For example, for a company having a profit-based Incentive Compensation budget value of $6,871,702 and a total Income (profit-driven Incentive Compensation target) value of $6,663,562, the Profit Sensitivity is calculated to be 1.04 or 104% ($6,871,702/$6,663,562). A graphical user interface window 240 displaying dial-like graphical representations of the strategic metric values, and showing the resultant PS value 246 are shown in FIG. 8. In this exemplary interface, the window 240 also displays the budgeted profit-drive Incentive Compensation ($6,871,702) which is a representation in dollars reflecting profit sensitivity.

Accordingly, this PS metric relates incentive compensation directly related to, i.e. payable as a function of, profit to income/profit, and thus is somewhat similar to the conventional "quick ratio" financial metric, which is an arduous liquidity test relating cash, short-term marketable securities, and accounts receivable (A/R) to current liabilities. While arduous as well, the PS metric is unlike the quick ratio in that it reflects the company's ability to fund its profits, if needed, from incentive compensation.

This PS metric is particularly important in people-intensive organizations in which human capital costs, including incentive compensation, is greater than profits. In such an organization, even a small change in the level and/or structure of incentive compensation, e.g. to tie it more closely to profit-based incentive compensation, can have a major impact on the profitability of the organization.

It should be noted that, with the exception of the cost of equity, all of the items/inputs/arguments of the equations above can be obtained, directly or indirectly, from the existing financial statements of the organization, such as the profit and loss (P&L) statement. Both the desired cost of equity and the P&L statements are readily available, and thus the methodology of the present invention may be used without the need for advance preparation, changes in practices, etc. by a typical organization.

Referring again to FIG. 2, the system 10 next calculates a value for an index as a function of the HCP, ROHC and PS metrics, to combine these metrics into a composite index value, as shown at step 62. This step is also reflected in step 82 of FIG. 4, which recites calculating an index value as a weighted sum of the Human Capital Productivity, Return On Human Capital and Profit Sensitivity values. A variety of equations may be used for this purpose. An exemplary equation for calculating the index is:

$$\text{Index} = C_1 \frac{HCP}{B_{HCP}} + C_2 \frac{ROHC}{B_{ROHC}} + C_3 \frac{PS}{B_{PS}}$$

Where $C_1$, $C_2$ and $C_3$ are arbitrary coefficients providing mathematical weighting to each of the factors HCP, ROHC, and PS. The values of the coefficients may be selected as desired, and may be used to provide weightings to each factor as desired for analysis purposes. If mere period-to-period benchmarking of a single organization is desired, $C_1$, $C_2$ and $C_3$ may be any coefficients, provided that they are used consistently across all periods. However, if organization-to-organization benchmarking is desired, it is preferred that the coefficients are used consistently across organizations. Optionally, equal weighting is applied to the value for each metric ($C_1 = C_2 = C_3 = 0.333$).

$B_{HCP}$, $B_{ROHC}$ and $B_{PS}$ are plan/budgeted values for each of HCP, ROHC and PS, respectively. For example, an annual financial plan or budget may assume or be based upon a target/goal value of 1.5; accordingly $B_{HCP} = 1.5$. These budget values may be set arbitrarily, empirically, historically, etc. for each organization, according to each organization's expectations, stated goals, etc. $B_{PS}$ could be set by default to 100% to represent a philosophy by which at 100%, profitability should be protected by incentive compensation.

For example, for a company having an observed (e.g., mid-year) HCP value of 1.23, an observed ROHC value of 14.25% and a PS value of 104%, $B_{HCP}$=$1.28, $B_{ROHC}$=15.5% and $B_{PS}$=100%, and assuming $C_1$=0.40, $C_2$=0.40 and $C_3$=0.20, the Index value would be 0.96 (0.40×($1.23/$1.28)+0.40×(0.1425/0.155)+0.20×(1.04/1)=0.96), which is to be compared against a goal of 1.00. Accordingly, the HCP value is $1.23, which is to be compared to a budgeted amount of $1.28. The HCP Index value is 0.961×0.40. Further, the ROHC value is 14.25%, which is to be compared against a budgeted amount of 15.5%. The ROHC Index value is 0.919×0.40. And finally, the PS value of 104% is compared against a goal of 100%, and its Index value is 1.04×0.20. This composite Index value (0.96) near 1.00 indicates that the organization is approaching its goals, but that there is room for improvement. The HCP and ROHC metric areas (each less than 100% of the budget goal) are indicative of areas needing improvement. The PS metric value in excess of 1.00 (100%) indicates that profit-driven incentive compensation is more than adequate to fund the budgeted profit for the period.

A graphical user interface window 240 displaying dial-like graphical representations of the arguments 242, 244, 246 of the Index equation and the resultant Index value 250 are shown in FIG. 8. Preferably, each dial is configured to place the budgeted value ($B_{HCP}$, $B_{ROHC}$ and $B_{PS}$) at the 12:00 o'clock (vertical) position on each dial, such that when a goal is being achieved for each metric, or for the index as a whole, the corresponding needle of the correspond dial-like graphical representation is at the 12:00 o'clock (vertical) position, which provides for a particularly effective representation of the information to be conveyed, at a glance.

It should be noted that these inputs may be provided, and the metrics and index may be calculated, for an organization as a whole ("company" level) or for multiple individual business units of the organization, as desired.

It should be further noted that there may be some variation among organizations as to which expense categories and specific line items would be regarded as human capital costs. However, the methodology of the present invention is sufficiently flexible to account for such variation, and focuses on consistency from period to period for a particular organization.

As noted above, the index's primary value is for comparative purposes. Optionally, comparative index data, or even comparative HCP, ROHC and PS data, is stored in a memory of the system 10, or in a memory that is accessible to the system via a communications network. The comparative data may be data for prior periods for the same organization, or for the same or prior periods for other organizations. In this manner, the organization can compare its metrics/performance to itself to gauge change/improvement, and to others for benchmarking purposes. If there is no such comparative data, the method simply ends at step 68. Such information may be provided in a printed or other report to be used for manual review and consideration, etc.

If comparative data is available, HCP, ROHC, PS and/or index values may be compared to similar values of the comparative data, as shown at step 64. For example, metric and index data for a first period may be compiled and stored in the system's memory, and then metric and index data for a second, later period, may be compiled and stored, and then the second period data may be compared to the prior period data for comparison purposes. Changes in the metrics and index reflect changes in the organization. Alternatively, metric and index data for a first organization may be compiled for an organization and compared to a different organization, or group of organizations, or composite data for a group of organizations. Exemplary graphical representations of prior period comparative data are shown in chart form in FIGS. 5-8.

A report is then prepared, preferably by the system in automated fashion, as shown at step 66. The report identifies financial data contributing to differences from the comparative data, etc. For example, the report may identify as a contributing factor any financial information, argument, or metric that differs by more than X %/standard deviation, etc. from an average, etc. For example, the Index and metric values could be compared, and/or the arguments (HCC, FCC, R, MC, etc.) of the metrics and the relative values of human capital and financial capital costs could be compared. Accordingly, comparisons and observations may be made that can be used to identify areas for improvement. For instance, it may be determined that compared to a peer group, the ratio of profit-driven incentive compensation to profit is low and therefore it may be advisable to increase the ratio of profit-driven incentive compensation to profit.

As mentioned above, the index and metrics may be used to help an organization's management make informed decisions about the financial consequences of strategic actions related to its workforce, e.g., by executing various "what if" scenarios. Further, the metrics and index can assist in identifying where and how in an organization value is being created or wasted, with a focus that is suitable for people-intensive businesses, and that highlights the productivity of people, rather than financial capital. By way of further example, after the Index and strategic metrics (HCP, ROHC, and PS) are calculated, the arguments and individual elements compiled in each argument of each metric may be examined to identify where the numbers are changing. From this it can be discerned what is driving the changes in the metrics, and human capital strategic interventions can be identified that will positively impact future financial results. For example, if the HCP metric is trending in an unfavorable direction over time, the arguments are examined, and it may be determined that HCC costs are increasing at an alarming rate. The individual elements of the HCC costs are then examined, and it may be determined, for example, that it is increases in the benefit costs that are the main culprit. This would be reflected in the report. Accordingly, a plan may be developed to lower benefits costs, e.g., by focusing on benefit programs that have lower cost increases.

Accordingly, in a broad sense, the index and strategic metrics (HCP, ROHC, and PS) provide a company's policymakers with a set of key performance indicators for the single largest investment most companies make, namely, investment in human capital. Companies invest in human capital to drive both revenue and profits. Thus, the metrics are structured to place an emphasis on the productivity of people, rather than financial capital, and thus isolate the main driver of financial performance in people-intensive organizations. These metrics measure the revenue impact of the human capital investment, as well as the economic value that is added to the business by the human capital investment. Finally, by focusing on the relationship of profit-driven incentive compensation to profit, the inventive approach helps a company to more effectively manage its financial performance. Measuring these results over time and across business units provides companies with information that may be used to decide what they should be doing differently with their human capital investment in the future to improve the financial performance of the business. This provides useful information to identify parameters that may be altered to improve financial performance, at both the corporate and business unit level, and to allow for benchmarking, over time, and to competitors, etc.

Accordingly, after determination of an index value, the calculated metric values, the arguments thereof, and the data aggregated in each of the arguments may be reviewed, and consideration may be given to each value so that driving factors can be identified for consideration and/or adjustment to improve the index value, and thus an organization's overall profitability. Further, a business decision may be made, a strategy implemented, etc. to adjust one of those items to improve a calculated metric, and thus the index, and thus the organization's profitability. For example, as a result of determination and analysis of the index and the driving factors, etc. it may be resolved to increase a value of an argument in a numerator, or decrease a value of an argument in a denominator to cause an increase in the index value. By examining the data aggregated in an argument, individual line items may be considered for increase or reduction. For example, material costs may be decreased to increase the HCP metric value, and thus the index value. Further, after it is determined to decrease material costs, etc., the various component costs aggregated in material costs may be considered to determine which one(s) may be/should be decreased. Accordingly, purchases may be made or foregone, prices may be renegotiated, etc. In particular, for people-intensive organizations, the people-related costs may be considered with a desirable level of clarity, e.g. to reconsider and optionally modify/adjust staffing plans, development programs, performance management programs, succession planning, compensation and benefits, outsourcing, quality, responsiveness and efficiency of the services provided, etc. Accordingly, aspects of an organization's current human capital strategy can be considered and determinations may be made to determine what should be changed to have a significant impact on the organization's profitability, preferably at low cost and in a short time, etc. Comparison to prior period data, or competitor's/industry/benchmark data, etc. may be useful in identifying which factors are well-suited for change that will result in meaningful improvement of the organization's profitability.

The methodology relating to the index and strategic metrics (HCP, ROHC and PS) generally involves calculating a human capital productivity ratio between (a) human capital costs and (b) a combination of human capital costs and financial capital costs, which expresses the productivity of human capital on a monetary, capital-weighted basis. Further, the method involves calculating a return on human capital ratio between EBITDA in excess of Financial Capital Costs and a monetary investment in human capital. Further still, the method involves calculating a ratio between budgeted, profit-driven, incentive compensation and profit (as defined by each client), to determine how sensitive the organization's profitability is to changes in incentive compensation. Accordingly, these are monetary, capital-weighted calculations.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A method for managing an organization's financial investment in human capital resources, the method comprising:

providing an information processing system comprising a microprocessor for executing programs, a memory operatively connected to said microprocessor, and a program stored in said memory and executable by said microprocessor:

operating the information processing system to:

cause the microprocessor to execute the program to receive as inputted data information gathered from the organization's financial statements;

cause the microprocessor to execute the program to calculate revenue, material cost, financial capital cost, and human capital cost as a function of the inputted data;

cause the microprocessor to execute the program to determine the organization's human capital productivity as a function of the organization's revenues related to human capital costs in relation to the organization's total human capital costs and financial capital costs for a defined period;

cause the microprocessor to execute the program to determine the organization's return on human capital as a function of the organization's income in excess of its financial capital costs in relation to its monetary investment in human capital for the defined period;

determining cause the microprocessor to execute the program to determine the organization's profit sensitivity as a ratio between budgeted, profit-driven incentive compensation and profit to determine how sensitive the organization's profitability is to changes in incentive compensation;

cause the microprocessor to execute the program to determine an index value as a weighted sum of the organization's human capital productivity, return on human capital, and profit sensitivity, the index value providing a single composite measure of the organization's financial investment in human capital resources;

cause the microprocessor to execute the program to identify a specific value to be adjusted to improve the index value, the specific value being selected from the group consisting of a metric value, an argument used to calculate a metric values, and information used to calculate an argument; and making a business decision to adjust the specific value, the business decision causing changes in operations of the organization that will necessarily change a calculated value of at least one of revenue, material cost, financial capital cost, and human capital cost, and thereby adjust a calculation of the specific value.

2. The method of claim 1, wherein the program's determining the organization's human capital productivity comprises the program's calculating a human capital productivity (HCP) metric value as $$HCP = \frac{R - MC}{HCC + FCC}$$

where, R is a value representing the organization's revenue, MC is a value reflecting the organization's material costs, FCC is a value representing the organizations financial capital costs, and HCC is a value representing the organization's human capital costs, for a defined period of time;

wherein determining the organization's return on human capital comprises calculating a return on human capital (ROHC) metric value as $$ROHC = \frac{I - FCC}{HCC}$$

where, I is a value representing the organization's Income, FCC is a value representing the organization's financial capital costs, and HCC is a value representing the organization's human capital costs, for the defined period of time;

wherein determining the organization's profit sensitivity comprises calculating a profit sensitivity (PS) metric value as $$PS = \frac{IC}{I_C}$$

where, IC is a value representing the organization's budgeted profit-driven Incentive Compensation, and $I_C$ is a value representing an organization-defined Income; and wherein determining the index value comprises calculating an index value metric as $$\text{Index} = C_1 \frac{HCP}{B_{HCP}} + C_2 \frac{ROHC}{B_{ROHC}} + C_3 \frac{PS}{B_{PS}}$$

where $C_1$, $C_2$ and $C_3$ are arbitrary coefficients providing mathematical weighting to each of the HCP, ROHC, and PS metrics, and wherein $B_{HCP}$, $B_{ROHC}$ and $B_{PS}$ are budgeted values for each of HCP, ROHC and PS, respectively.

3. The method of claim 1, further comprising: operating the information processing system to cause the microprocessor to execute the program to prepare a report displaying the calculated index value.

4. The method of claim 3, wherein the report is displayed by a video display device of a computerized device.

5. The method of claim 3, wherein the report is prepared in printed form.

6. The method of claim 2, wherein each of R, MC, I, FCC, HCC and $I_C$ is calculated by the program as a function of at least one value identified on a financial statement for the organization.

7. The method of claim 2, wherein HCC is calculated by the program by summing values representing employee costs, costs in support of employees, and costs in lieu of employees for the organization.

8. The method of claim 7, wherein each of employee costs, costs in support of employees and costs in lieu of employees is determined by the program as a function of at least one value identified by a general ledger account of the organization.

9. The method of claim 2, wherein the value representing the organization's Income for use by the program in calculating the ROHC metric is an EBITDA value of the organization for the defined period of time.

10. The method of claim 2, wherein $C_1$, $C_2$ and $C_3$ provide unequal mathematical weight to each of the factors.

11. A computer-implemented method for analyzing an organization's financial investment in human capital resources, the method being carried out by an information processing system comprising a microprocessor for executing programs, a memory operatively connected to said microprocessor, and a program stored in said memory and executable by said microprocessor to carry out the method, the method comprising:

receiving information gathered from the organization's financial statements as inputted data;

calculating, by the information processing system, a human capital productivity (HCP) value as $$HCP=(R-MC/(HCC+FCC)),$$

where, R is a value representing the organization's revenue, MC is a value reflecting the organization's material costs, FCC is a value representing the organizations financial capital costs, and HCC is a value representing the organization's human capital costs, for a defined period of time, each of R, MC, FCC and HCC being calculated as a function of the inputted data;

calculating a return on human capital (ROHC) value as $$ROHC=(I-FCC)/HCC$$

where, I is a value representing the organization's Income for the defined period of time, I being calculated as a function of the inputted data;

calculating a profit sensitivity (PS) metric value as $$PS=IC/I_C$$

where, IC is a value representing the organization's budgeted profit-driven Incentive Compensation, and $I_C$ is a value representing an organization-defined Income;

calculating an index value as $$\text{Index}=C_1(HCP/B_{HCP})+C_2(ROHC/B_{ROHC})+C_3(PS/B_{PS})$$

where $C_1$, $C_2$, and $C_3$ are arbitrary coefficients providing mathematical weighting to each of the HCP, ROHC, and PS metrics, and wherein $B_{HCP}$, $B_{ROHC}$ and $B_{PS}$ are budgeted values for each of HCP, ROHC and PS respectively;

identifying a specific value to be adjusted to improve the index value, the specific value being selected from the group consisting of a metric value, an argument used to calculate a metric values, and information used to calculate an argument; and providing a report including a recommendation to adjust the specific value.

12. The method of claim 11, further comprising:

comparing at least one of the calculated HCP metric, ROHC metric, PS metric and Index values for the defined period of time to a corresponding value previously calculated for the organization for a second period of time earlier than the defined period of time.

13. The method of claim 12, further comprising:

identifying at least one contributing factor contributing to a difference between the organization's values and the comparative data, the contributing factor being selected from the group consisting of the index, the metric values, the arguments used to calculate the metric values, and any financial information used to calculate the arguments; and preparing a report displaying at least one contributing factor and the index value.

14. The method of claim 12, further comprising:

identifying at least one contributing factor contributing to a difference between the organization's values and the comparative data, the contributing factor being selected from the group consisting of the index, the metric values, the arguments used to calculate the metric values, and any financial information used to calculate the arguments; and preparing a report displaying at least one contributing factor, and a recommendation to modify the at least one contributing factor.

15. The method of claim 12, further comprising:
identifying at least one contributing factor contributing to a difference between the organization's values and the comparative data, the contributing factor being selected from the group consisting of the index, the metric values, the arguments used to calculate the metric values, and any financial information used to calculate the arguments; and
recommending a business decision causing change in a respective value of the contributing factor to improve profitability of the organization.

16. The method of claim 11, further comprising:
making a business decision to cause change in a respective value of the contributing factor as a function of the index, the change tending to result in improvement of the calculated index and thus improved profitability of the organization.

17. The method of claim 13, wherein said contributing factor is identified by its difference by more than a predetermined amount from corresponding comparative data.

18. The method of claim 17, further comprising comparing at least one of the calculated HCP metric, ROHC metric, PS metric and Index values for the defined period of time to comparative data for organizations other than the organization, the comparative data being stored in a memory of a computerized system.

19. The method of claim 18, further comprising:
identifying at least one contributing factor contributing to a difference from the comparative data, the contributing factor being selected from the group consisting of the index, the metric values, the arguments used to calculate the metric values, and any financial information used to calculate the arguments; and
preparing a report displaying at least one of the contributing factor and the index value.

20. The method of claim 19, wherein said contributing factor is identified by its difference by more than a predetermined amount from corresponding comparative data.

21. A non-transitory computer readable medium comprising microprocessor-executable instructions for configuring a computerized device to:
calculate a human capital productivity (HCP) value as $$HCP = \frac{R - MC}{HCC + FCC}$$

where, R is a value representing the an organization's revenue, MC is a value reflecting the organization's material costs, FCC is a value representing the organization's financial capital costs, and HCC is a value representing the organization's human capital costs, for a defined period of time, each of R, MC, FCC and HCC being calculated as a function of inputted data;
calculate a return on human capital (ROHC) value as $$ROHC = \frac{I - FCC}{HCC}$$

where, I is a value representing the organization's Income for the defined period of time, I being calculated as a function of inputted data;

calculate a profit sensitivity (PS) metric value as $$PS = \frac{IC}{I_C}$$

where, IC is a value representing the organization's budgeted profit-driven Incentive Compensation, and $I_C$ is a value representing an organization-defined Income; and
calculate an index value as $$Index = C_1 \frac{HCP}{B_{HCP}} + C_2 \frac{ROHC}{B_{ROHC}} + C_3 \frac{PS}{B_{PS}}$$

where $C_1$, $C_2$ and $C_3$ are arbitrary coefficients providing mathematical weighting to HCP, ROHC, and PS, respectively, and wherein $B_{HCP}$, $B_{ROHC}$ and $B_{PS}$ are budgeted values for each of HCP, ROHC and PS, respectively.

22. The non-transitory computer readable medium of claim 21, further comprising microprocessor-executable instructions for configuring a computerized device to:
compare at least one of the calculated HCP metric, ROHC metric, PS metric and Index values for the defined period of time to a corresponding value;
identify at least one contributing factor contributing to a difference between the organization's values and the comparative data, the contributing factor being selected from the group consisting of the index, the metric values, the arguments used to calculate the metric values, and any financial information used to calculate the arguments; and
prepare a report displaying at least one contributing factor and the index value, the contributing factor being identified by its difference by more than a predetermined amount from corresponding comparative data.

23. An information processing system for performing automated analysis of financial investment in human capital resources, the system comprising:
a microprocessor for executing programs;
a memory operatively connected to said microprocessor;
a first program stored in said memory and executable by said microprocessor to:
calculate a human capital productivity (HCP) value as $$HCP = \frac{R - MC}{HCC + FCC}$$

where, R is a value representing an organization's revenue, MC is a value reflecting the organization's material costs, FCC is a value representing the organization's financial capital costs, and HCC is a value representing the organization's human capital costs, for a defined period of time, each of R, MC, FCC and HCC being calculated as a function of inputted data;
calculate a return on human capital (ROHC) value as $$ROHC = \frac{I - FCC}{HCC}$$

where, I is a value representing the organization's Income for the defined period of time, I being calculated as a function of inputted data;

calculate a profit sensitivity (PS) metric value as $$PS = \frac{IC}{I_C}$$

where, IC is a value representing the organization's budgeted profit-driven Incentive Compensation, and $I_C$ is a value representing an organization-defined Income; and calculate an index value as $$\text{Index} = C_1 \frac{HCP}{B_{HCP}} + C_2 \frac{ROHC}{B_{ROHC}} + C_3 \frac{PS}{B_{PS}}$$

where $C_1$, $C_2$ and $C_3$ are arbitrary coefficients providing mathematical weighting to HCP, ROHC, and PS, respectively, and wherein $B_{HCP}$, $B_{ROHC}$ and $B_{PS}$ are budgeted values for each of HCP, ROHC and PS, respectively.

24. The information processing system of claim 23, the first program being stored in said memory and executable by said microprocessor to:

compare at least one of the calculated HCP metric, ROHC metric, PS metric and Index values for the defined period of time to a corresponding value;

identify at least one contributing factor contributing to a difference between the organization's values and the comparative data, the contributing factor being selected from the group consisting of the index, the metric values, the arguments used to calculate the metric values, and any financial information used to calculate the arguments; and prepare a report displaying at least one contributing factor and the index value, the contributing factor being identified by its difference by more than a predetermined amount from corresponding comparative data.

* * * * *